United States Patent Office 3,219,786
Patented Nov. 23, 1965

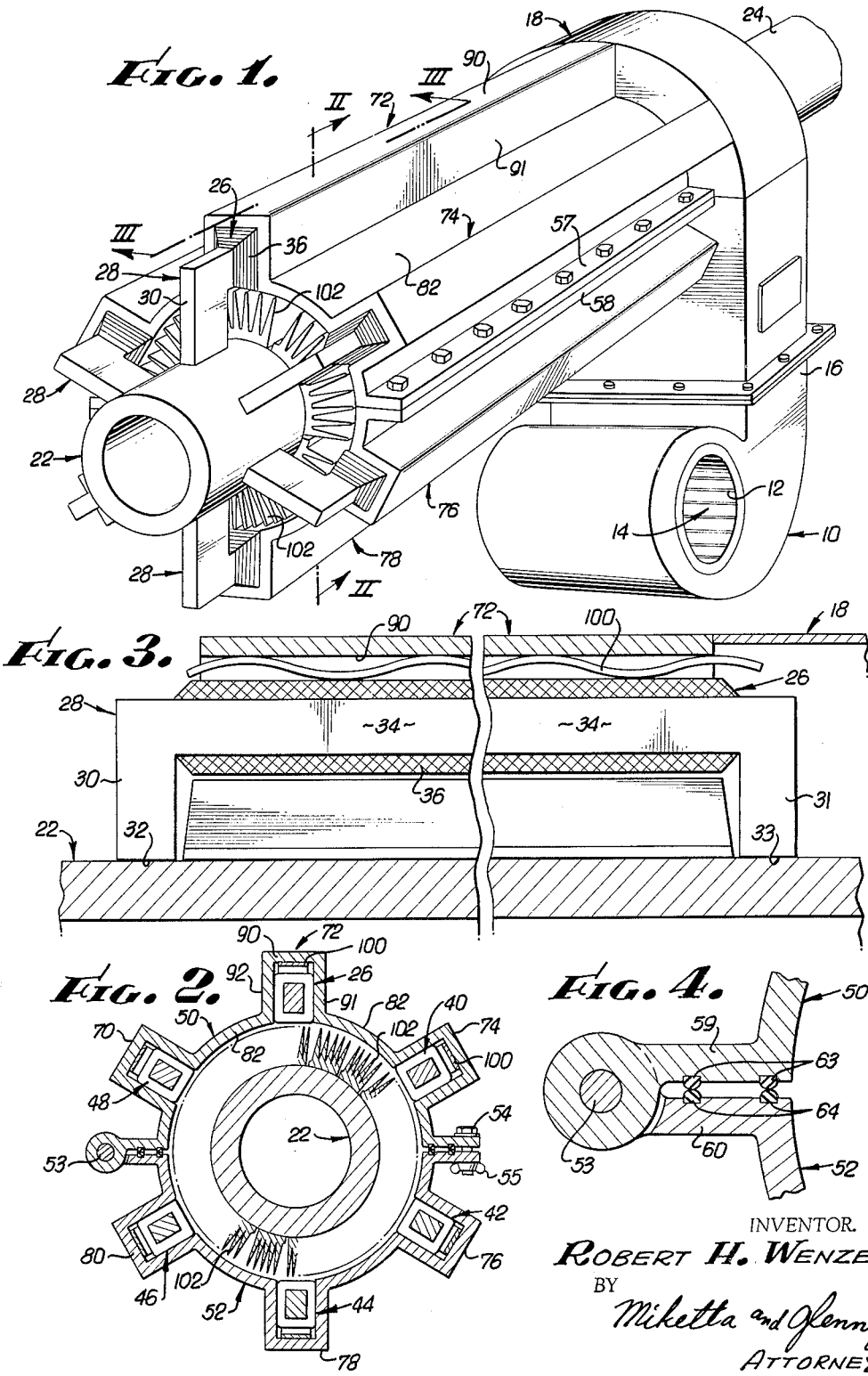

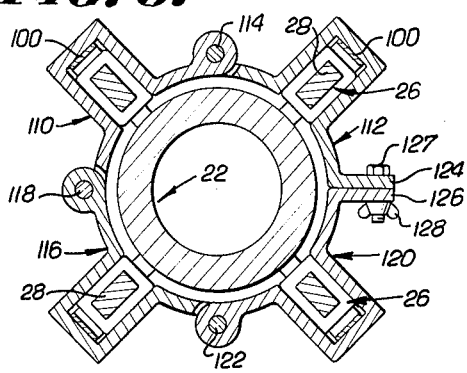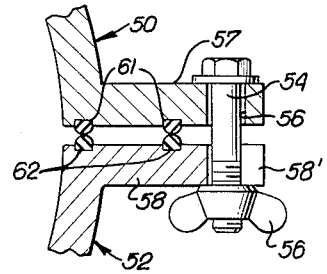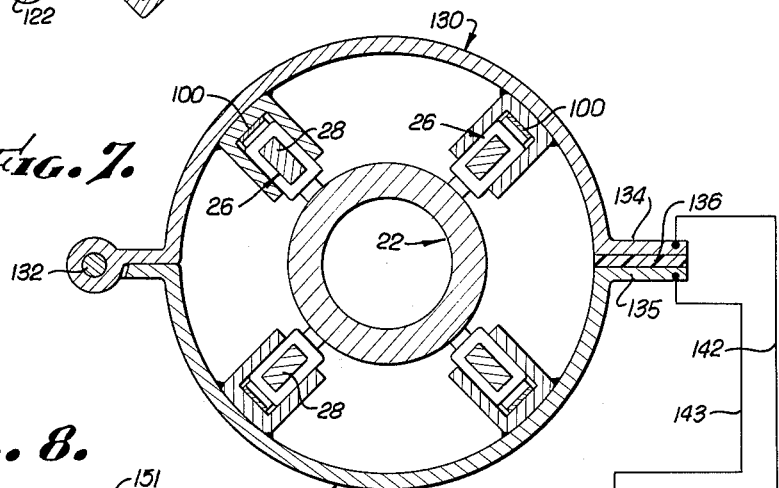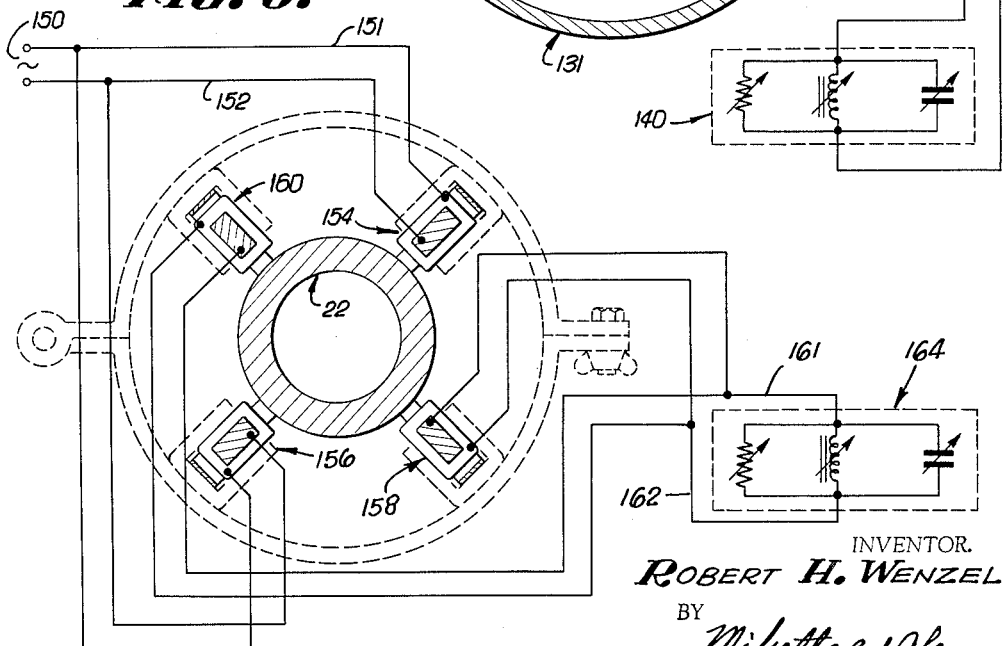

3,219,786
INDUCTION HEATING DEVICE CONSTRUCTION
Robert H. Wenzel, 3416 E. Ruth Place, Orange, Calif.
Filed Aug. 6, 1962, Ser. No. 215,019
18 Claims. (Cl. 219—8.5)

This invention contemplates the control of leakage flux in induction heating machines, whereby to more efficiently and rapidly heat a workpiece. The apparatus of the invention provides additional advantages in expediting assembly and disassembly of the heating machine on a workpiece, and in readily adapting the heating machine to workpieces of differing sizes and shapes.

Induction heating devices are used in many industrial processes including pre-heating of pipe preparatory to welding, heating of material such as plastic or the like preparatory extruding it in desired form, and similar purposes. The present invention will be illustratively described in connection with the heating of a tubular cylindrical workpiece of electrically conductive, ferromagnetic material such as steel pipe. In heating an axially extending workpiece of this character, there are conventionally provided one or more inductors for generating an alternating magnetomotive force between two contact zones spaced longitudinally of the workpiece, and the flux thus produced generates voltages producing currents which circulate in the workpiece. As is well known, flow of these currents creates the desired heat; hysteresis loss may also contribute, but normally to only a minor degree.

Power factor improvement and other reasons make it desirable to control the leakage flux inevitably produced by the inductors of a heating machine of this character. In a preferred embodiment of the present invention this is accomplished by the provision of casement means surrounding the workpiece and inductors with portions of the casement means in close proximity to the inductors of the machine, the casement being made of highly conductive material of low permeability, such as aluminum. Leakage flux generates voltages causing current flow generally circularly around the casement. Since the path provided by the casement is essentially a short circuit, the current will be high. Such current establishes magnetic flux in opposition to inductor leakage flux and approximately equal thereto in magnitude, thereby minimizing the net leakage flux and enhancing the energy transfer to the workpiece.

For some purposes it may be desirable to insert into the electrical circuit of the casement means a variable impedance such as might be provided, for example, by a saturable core reactor. Control of the excitation current of such a reactor by the operator effectively controls the temperature produced in the machine. Alternatively, the windings of one or more of the inductors, instead of being energized from the A.C. power source, may be disconnected therefrom and connected to a variable impedance.

From the mechanical viewpoint, the apparatus of the present invention provides substantial advantages in operation. Thus the casement means may consist of two or more shells hingedly or otherwise connected toegther to permit rapid assembly and disassembly on the workpiece. The casement is desirably formed to physically support the inductors in desired position, either by longitudinally extending pockets integrally formed in the casement, or by suitable retaining brackets extending inwardly from the concave inner surface of the casement. Resilient means may be included to bias the inductors inwardly from the casement, to insure intimate contact with the workpiece so that airgaps in the magnetic circuit are minimized. Moreover, the casement may be segmented into a number of shell elements to permit use of a selected number of elements in a given operation, so that the machine may be quickly adapted for use with workpieces having widely varying diameters or other cross-sectional dimensions.

The construction furthermore readily lends itself to use where cooling of the workpiece may be required as, for example, where an extrusion machine generates excess heat from frictional forces within the tubular workpiece. Thus the casement may constitute a conduit for guiding coolant fluid such as air along the outer surface of the workpiece, and cooling fins may be employed to accelerate the cooling in such an arrangement.

Accordingly, it is a principal object of the present invention to disclose novel improvements in the design and construction of induction heating devices. Other objects are to provide, in such a device, low resistance, low permeability casement means for providing a short circuit path for current flow resulting from voltage generated by leakage flux; to provide in such a device variable impedance means for controlling current flow in the casement; to provide for using one or more inductors for control of leakage flux; to provide conductive casement means in the form of a plurality of articulated shells held in assembled relation by clamp means to facilitate assembly and disassembly on a workpiece; to provide in such shells angularly spaced longitudinal pockets for snugly receiving the inductors and means for biasing the inductors toward the workpiece; to provide such a construction permitting expansion under heat; to provide such a construction serving to effectively direct coolant fluid such as air into heat-removing contact with the device; and for other and additional purposes as will be understood from the following description of exemplary embodiments of the invention taken in connection with the accompanying drawings in which:

FIG. 1 is an isometric view of an induction heating device of the present invention mounted on a hollow cylindrical workpiece and including cooling means advantageously usable in certain applications of the invention.

FIG. 2 is a transverse sectional view taken on line II—II of FIG. 1.

FIG. 3 is a longitudinal sectional view, with intermediate portions omitted, taken on line III—III of FIG. 1.

FIGS. 4 and 5 are fragmentary views on an enlarged scale of preferred forms of hinged and clamped connections respectively of the casement shells.

FIG. 6 is a transverse sectional view similar to FIG. 2 but showing another embodiment of the invention.

FIG. 7 is a transverse sectional view similar to FIG. 2 but showing another embodiment of the invention including a modified form of casement and variable impedance means in the casement electrical circuit.

FIG. 8 is a transverse sectional view similar to FIG. 7 with the casement shown in dotted outline for clarity of illustration of an alternative use of variable impedance means in accordance with the invention.

In FIG. 1 there is indicated generally at 10 a typical form of coolant blower advantageously usable in connection with one embodiment of the present invention, wherein an air inlet opening 12 permits outside air to be centrifugally driven by rotatable fan blades indicated generally at 14 upwardly through air conduit 16 into a chamber indicated generally at 18. The latter two elements are retained in assembled relation by suitable means, such as bolted attachment flanges indicated generally at 20, and air then flows forwardly from chamber 18 as will be described.

Extending generally forwardly from the chamber 18 is the induction heating device proper. Typically, the heating device may be used in connection with an extrusion machine, and in the present illustration the workpiece to be heated constitutes a ferromagnetic conductive elongated cylinder indicated generally at 22 and adapted to be connected in known manner to an extrusion die or other forming device. Raw material to be heated and thus prepared for forming may be supplied from a suitable source (not shown) connectable to the upper or rear end 24 of the workpiece 22. Thus the flow of heatable flowable material in the workpiece is generally downwardly and leftwardly as seen in FIG. 1.

Means are provided for heating the workpiece 22, and in the present illustration such means include a plurality of electrically energized inductors spaced angularly about the workpiece and extending radially outwardly therefrom. One of the inductors is indicated generally at 26 and includes core laminations indicated generally at 28. The laminations have generally radially disposed end portions or legs 30 and 31 (see FIG. 3) terminating inwardly in the pole faces 32 and 33 respectively in contact with workpiece 22, and integral central or intermediate portions 34 extending longitudinally of the workpiece between the end legs and spaced outwardly from the workpiece. A magnetizing winding or coil 36 is provided on the intermediate portion 34, the winding being connectable in known manner to a source of alternating electrical power (not shown).

As best seen in FIG. 2, there are provided a plurality of inductors angularly spaced, desirably equally, about the central workpiece 22, including, in addition to inductor 26 just described, inductors indicated generally at 40, 42, 44, 46 and 48. The several inductors are desirably retained in place as seen by the casement means of the present invention. The casement includes a pair of shell members indicated generally at 50 and 52 respectively, the shell members extending longitudinally or axially of the machine as is seen in FIG. 1. The shells may be generally semi-cylindrical in shape and are desirably articulated, being hingedly joined at one side along the pivotal axis of hinge pin 53 and at the other side by suitable clamp means here illustratively shown as including bolts 54 and wing nuts 55. The bolts extend through oversize bores 56 spaced along enlarged flange 57 of shell 50, the corresponding enlarged flange 58 of shell 52 desirably having spaced slots 58' to permit rapid assembly and disassembly of shells 50 and 52 on the workpiece. In order to minimize electrical resistance around the casement, the flanges 57 and 58 provide enlarged juncture faces in tight low resistance contact when the shells are assembled, and at the pivotal or hinged connection along hinge pin 53, there may be provided enlarged flanges 59 and 60 on the shells for the same purpose.

Additional means may be provided to enhance the electrical conductance between shells. As seen in FIGS. 4 and 5, each of the flanges 57, 58, 59 and 60 may be provided with one or more contact strips 61, 62, 63 and 64 respectively, each strip desirably extending substantially the entire length of the shells. The strips are of material resistant to corrosion and of high conductivity, such as silver, and may be inlaid in the flanges with upper portions projecting beyond the flange faces and in alignment with strips in the opposed flange when the shells are assembled. The upper portions may be convex as seen in transverse section in order to increase the pressure between mating strips and thus decrease contact resistance when the shells are drawn together by the clamping means.

In the form of the invention shown in FIG. 1, each of the shells is configured to provide one or more longitudinally extending pockets and arcuate portions extending between successive pockets. Each of the pockets is adapted to snugly house one of the inductors. Thus, shell 50 includes pockets indicated generally at 70, 72 and 74, while shell 52 includes pockets 76, 78 and 80. Extending between and formed integrally with the pockets are arcuate portions 82, and the arcuate portions which extend between successive pockets formed in different shells include the juncture faces and flanges previously referred to.

Each of the pockets is desirably formed to have a shape, as seen in section, of a three-sided rectangle, inwardly open to receive therein an inductor. Thus, with particular reference to pocket 72 receiving the inductor 26, such pocket includes an outermost base portion 90 and a pair of side walls 91 and 92 extending in parallel relation approximately radially between the base portion 90 and the arcuate portions 82 of the shell.

With particular reference to FIG. 3 it will be seen that core pole faces 32 and 33 are in contact with the outer surface of the workpiece 22 at zones spaced axially along such outer surface. It is important that the contact between the pole faces and the workpiece be made with minimum air gap, so that the magnetic path for the flux generated by the magnetomotive force of winding 36 may have as small reluctance as possible. Means are accordingly desirably provided within the pocket 72 for resiliently urging the pole faces 32 and 33 into tight, low reluctance contact with the workpiece. In the present illustration such means may include a leaf spring 100 bearing against the inner surface of the base 90 of the pocket and the outer surface of the winding 34 on the inductor.

Under certain operating conditions it may be desirable to enhance the cooling effect of the coolant forced along the outer surface and the inner surface of the shells and inductors. For such purpose, heat-dissipating fins 102 of known construction may be fastened to the outer surface of the workpiece.

It will be noted that the construction permits a certain amount of expansion and contraction of the shell elements resulting from changes of temperature, without adversely affecting the characteristics of the electrical and magnetic circuits involved. This results from the configuration of the shells, with the arcuate portions between the pockets being disposed at a radius substantially smaller than the outside radius of the pockets themselves. Desirably, the arcuate portions extend between the innermost portions of the pockets as shown and described herein, thus permitting slight flexure of the side walls of the pockets to accommodate expansion and contraction during operation.

The shells of the articulated casement above described are generally semi-cylindrical, each extending effectively over 180° of arc. However, shells of lesser arcuate extent may afford additional advantages for particular purposes, such as adaptation of the present invention for heating workpieces of widely varying outside diameters or other exterior cross-sectional dimensions. Thus in FIG. 6 the non-magnetic low resistance casement includes four shells, each extending substantially 90° around the workpiece and each provided with a pocket extending longitudinally of the shell for receiving therein the major portions of an inductor as previously described. Thus, shell indicated generally at 110 is hingedly attached to the adjacent shell indicated generally at 112 by a pivot pin 114 extending through aligned bores formed in enlarged bosses carried by the shells. On the other side of shell 110, the adjacent shell indicated generally at 116 is similarly attached to shell 110 in hinged relation about the pivot pin 118; and shell 116 is similarly connected to shell indicated generally at 120 through a pivot pin 122. Shells 112 and 120 are each provided with an enlarged flange of the type previously described, the flanges being indicated at 124 and 126 respectively and being held in assembled relation by bolt 127 and wing-nut 128. With the construction thus described, taken in connection with the leaf springs 100 in the base of each shell pocket, it will be seen that the pole faces of the inductor core legs will be retained in close, low reluctance contact with the external surface of the workpiece 22. It may be noted, with further reference to FIG. 6, that no cooling fins are provided, it being assumed that this application of the heating device requires no cooling of the workpiece; for example, the workpiece here might be a pipe being preheated by the heating device of the present invention preparatory to welding of the pipe.

In FIG. 7 is shown a form of the present invention wherein the casement means consists of a pair of semi-cylindrical shells indicated generally at 130 and 131 of arcuately formed sheets or plates of non-magnetic conductive material, the shells being hingedly joined along pivotal axis 132 and opposite flanges 134 and 135 being electrically insulated by insulator strip 136 for reasons later appearing. Means may be provided to support and retain the inductors in position, such means being here shown as including U-shaped brackets 138 fixedly mounted on the inner wall of the shells and extending inwardly therefrom. Leaf springs 100 are desirably included in this form of the invention for the reasons previously discussed.

It may be desirable to control the current flow in the shell in order, for example, to accurately control the amount of heating energy transferred to the workpiece. This may be accomplished in accordance with the invention by variable impedance means schematically shown and indicated generally at 140 and connected by conductors 142 and 143 to flanges 134 and 135 respectively.

Control of heating by variable impedance means may be accomplished also by the arrangement of FIG. 8, where the casement is shown in dotted outline for clarity of presentation. As there shown, electric power from alternating source 150 is fed to some but less than all of the inductors. In the specific illustration, such power is fed through conductors 151 and 152 to inductors indicated generally at 154 and 156, and the necessary alternating magnetic field in workpiece 22 is thus generated. One or more of the remaining inductors indicated generally at 158 and 160 have their windings connected in parallel through conductors 161 and 162 to variable impedance means indicated generally at 164.

Variable impedance means 140 or 164 serve to control the current flow in workpiece 22 by reason of their effect upon current flow in the casement and the resultant effect upon leakage flux. Since casement current is of comparatively high magnitude, the circuit of FIG. 8 is likely to be useful in a wider variety of applications, because variable impedance means 164 and conductors 161 and 162 leading thereto may be generally of lower current carrying capacity than the corresponding components in FIG. 7. The arrangement of FIG. 8 contemplates using a plurality of excitation inductors 154 and 156 connected as a paralleled excitation set, and a plurality of control inductors 158 and 160 connected as a paralleled control set. Under these conditions, the flux density in a typical workpiece is usually advantageously made more nearly uniform when the inductors of each set are distributed around the workpiece in as nearly equal angular spacing as is practicable. Thus, with an equal number of inductors in each set, as in FIG. 8, the inductors of each set are desirably disposed in alternating relation with the inductors of the other set.

Although the windings of each set in FIG. 8 are connected in parallel, either or both could also be connected in series so that the apparatus is readily adapted for use with different excitation voltages. Sixty cycle or other low frequency excitation is contemplated, thus avoiding skin effect problems and making it unnecessary to provide frequency conversion equipment for use with commercial power sources.

High permeability of the workpiece is advantageous for rapid heating thereof in accordance with the invention, but low permeability material such as copper pipe may be pre-heated for brazing by the present arrangement, and ferromagnetic workpieces may be heated above their Curie points, although it is recognized that power transfer under these conditions suffers in comparison with high premability workpieces.

Modifications and changes from the specific illustrative embodiments of the invention herein described and shown are within the contemplation of the invention.

I claim:

1. In an induction heating device having longitudinally extending inductor means excitable by an A.C. source for producing alternating magnetic flux flowing longitudinally in an axially extending workpiece of electrically conductive material having high permeability, the provision of:

casement means of electrically conductive material having low permeability providing a circumferentially continuous path for current flow surrounding the inductor means and workpiece, a portion of said path being in close proximity to the inductor means.

2. The invention as stated in claim 1 wherein the casement means is articulated and includes a plurality of relatively movable shells and clamp means for retaining the shells in assembled relation.

3. The invention as stated in claim 1 wherein said inductor means includes a high permeability core having a pair of pole faces spaced longitudinally of the workpiece and including resilient means carried by the casement means for urging the pole faces into low reluctance contact with the workpiece.

4. The invention as stated in claim 1 wherein the workpiece has a generally cylindrical outer surface and the inductor means includes a core of high permeability material terminating in pole faces spaced longitudinally of said surface and in low reluctance contact therewith, and the casement means includes a plurality of shells joined in articulated relation, and clamp means retaining the shells in assembled relation.

5. The invention as stated in claim 4 wherein the shells are formed to provide inwardly open longitudinally extending pockets for receiving substantial portions of the inductor means between the pole faces.

6. The invention as stated in claim 5 including resilient means in said pockets for urging the inductor means inwardly of the casement toward the workpiece.

7. The invention as stated in claim 4 including heat dissipating elements in heat transfer contact with the workpiece surface.

8. The invention as stated in claim 1 wherein said workpiece has a generally cylindrical outer surface and the inductor means includes a plurality of inductors angularly spaced thereabout.

9. The invention as stated in claim 8 wherein each inductor includes a core of high permeability material having a longitudinally extending central portion and a pair of inwardly extending legs terminating in inwardly directed pole faces in low reluctance contact with the workpiece, and an electrical winding on the core.

10. The invention as stated in claim 9 wherein at least one of the inductor windings is energized by an A.C. source and including selectively adjustable variable impedance means connected to the winding of at least one other inductor.

11. In an electrical induction heating device having a central axially extending electrically conductive workpiece of high permeability material, a plurality of angularly spaced magnetic cores projecting radially outwardly from the workpiece, each core having radially extending end portions in low reluctance contact with the workpiece at axially spaced zones and an intermediate portion spaced radially from the workpiece, and an electric winding on the intermediate portion of each core, the winding on each core being angularly spaced from the winding on the neighboring cores, the provision of:

casement means of low permeability, electrically conductive material including a pair of elongated generally semi-cylindrical shells having matable juncture faces, each shell being formed to provide a plurality of angularly spaced longitudinally extending pockets and arcuate portions between the pockets, each pocket having a shape, as seen in section, of an inwardly open three-sided rectangle at least partially receiving one of the windings, and means retaining said shells in assembled relation with juncture faces in low resistance contact.

12. The invention as stated in claim 11 wherein each shell includes a pair of juncture flanges having enlarged surfaces constituting said juncture faces.

13. The invention as stated in claim 12 including longitudinally extending strips of high conductivity material inlaid in said faces, the strips of one shell contacting the strips of the other shell when the shells are assembled.

14. The invention as stated in claim 11 wherein said arcuate portions extend between the radially innermost portions of the pockets.

15. An induction heating device comprising:

a longitudinally extending workpiece of electrically conductive material;

an inductor including pole faces contacting said workpiece at longitudinally spaced zones thereof for passing an alternating magnetic flux between said zones;

and means of low permeability material for providing a low resistance circumferentially continuous path for current flow around said workpiece and inductor, a portion of the path being in close proximity to said inductor throughout a substantial portion of the inductor length.

16. The invention as stated in claim 15 including at least one additional inductor, said inductors being spaced angularly about said workpiece.

17. The invention as stated in claim 16 wherein said inductors include electrical windings, the winding of at least one inductor being energized by an A.C. source, and the winding of at least one other inductor being connected to a selectively adjustable variable impedance.

18. The invention as stated in claim 17 wherein said inductors comprise an excitation set of a plurality of inductors having their windings connected to an A.C. source and a control set of an equal plurality of inductors having their windings connected to a selectively adjustable variable impedance, the inductors being angularly spaced about the workpiece with each inductor of one set being disposed angularly between inductors of the other set.

References Cited by the Examiner

UNITED STATES PATENTS

| | | | |
|---|---|---|---|
| 1,365,199 | 1/1921 | Sessions | 219—8.5 |
| 2,090,692 | 8/1937 | Melton | 219—10.75 X |
| 2,266,176 | 12/1941 | Denneen et al. | 219—10.79 X |
| 2,404,987 | 7/1946 | Rudd | 219—10.79 X |
| 2,542,393 | 2/1951 | Chapman | 219—8.5 |
| 2,893,055 | 7/1959 | Wenzel | 219—10.49 X |
| 3,059,083 | 10/1962 | Herschmann | 219—10.75 |
| 3,129,459 | 4/1964 | Kullgren et al. | 219—10.49 X |

OTHER REFERENCES

Brown, German application 1,015,157, printed September 5, 1957, Class Kl 21h 29/03.

RICHARD M. WOOD, *Primary Examiner.*